S. B. COHEN.
SWITCH.
APPLICATION FILED MAY 23, 1919.
1,370,189.
Patented Mar. 1, 1921.
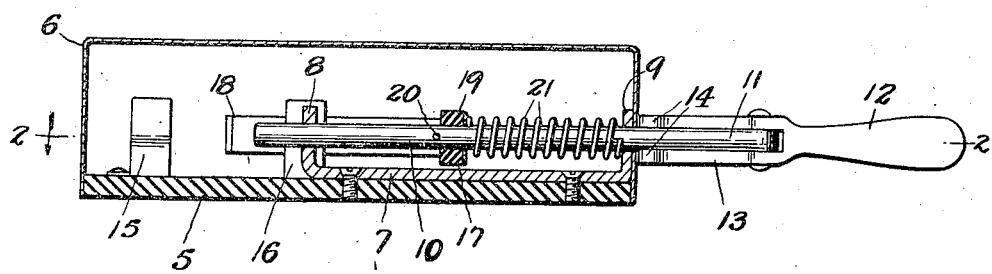
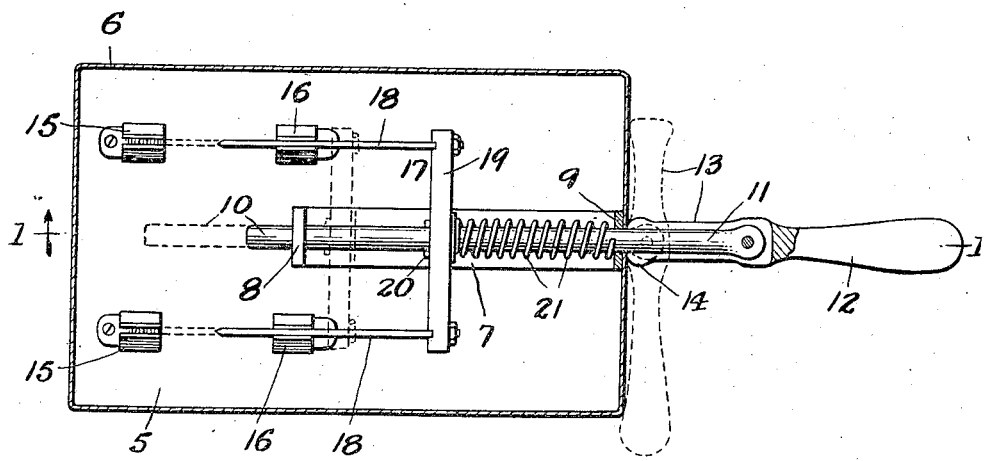
Inventor
Samuel B. Cohen
By his Attorneys
Edgar Vale Ho.

UNITED STATES PATENT OFFICE.

SAMUEL B. COHEN, OF NEW YORK, N. Y.

SWITCH.

1,370,189.　　　Specification of Letters Patent.　　Patented Mar. 1, 1921.

Application filed May 23, 1919. Serial No. 299,220.

*To all whom it may concern:*

Be it known that I, SAMUEL B. COHEN, a citizen of the United States, and residing at New York, in the county of New York and State of New York, have invented certain new and useful Improvements in Switches, of which the following is a specification, such as will enable those skilled in the art to which it appertains to make and use the same.

This invention relates to switch devices designed to open and close electric circuits; and the object of the invention is to provide a sliding switch device which is adapted to be operated in one direction by hand and in the opposite direction by a tensional device; and with this and other objects in view the invention consists in a device of the class specified which is simple in construction and operation and efficient in use.

The invention is fully disclosed in the following specification, of which the accompanying drawing forms a part, in which the separate parts of my improvement are designated by suitable reference characters in each of the views, and in which:—

Figure 1 is a central longitudinal section through my improved switch device, the section being taken on the line 1—1 of Fig. 2; and, Fig. 2 sectional plan view on the line 2—2 of Fig. 1.

In the drawing I have shown at 5 a suitable base board or support preferably composed of non-conducting material, and at 6 is shown a box-shaped casing mounted on top of and adapted to serve as a cover for the base 5. The casing 6 may be secured to the base 5 in any desired manner.

Mounted centrally and longitudinally of the top face of the base 5 is a strip 7, the opposite ends of which are bent upwardly to form bearings 8 and 9 in which is mounted a shaft 10, which is adapted to extend outwardly through one side of the casing 6 as shown at 11, and pivoted to the end thereof is an operating handle member 12, the inner end of which is forked as shown at 13 and the free ends of the forked portion 13 are rounded as shown at 14 and adapted to bear on and operate in connection with the adjacent side of the casing 6, as clearly shown in the drawing.

Secured to the base 5 within the casing 6 are two pair of spring poles or contact devices 15 and 16 and a fork-shaped switch member 17, comprising two contact blade members 18 secured in a transverse non-conducting head 19, is mounted on the shaft 10 and adapted to be moved therewith to bring the contact blade members 18 of the fork-shaped switch device into engagement with one or both pair of spring contact devices 15 and 16.

The yoke-shaped switch device is held on the shaft by a transverse pin 20 and a spiral spring 21, which moves the cross head 19 of the switch device into engagement with the pin 20, said spring being adapted to bear on or operate in connection with the bearing member 9 as clearly shown.

The position of the switch member 17 shown in full lines in Figs. 1 and 2 is the inoperative position thereof, or the switch is in an open position, and in this position it will be noted that the switch member 17 is held against inward movement by the fork-shaped portion 13 of the handle member 12, the rounded end portions 14 of which bear on the wall of the casing 6, but by moving the handle member 12 to the left or to the right, the spring 21 will move the switch member 17 inwardly or move the contact blade members 18 into engagement with the pair of spring contact devices 15 as indicated in dotted lines in Fig. 2 and thus close the circuit. In order to again open the circuit, or to move the switch device from the dotted line position shown in Fig. 2 to the full line position shown therein, the handle member 12 is grasped and moved outwardly against the tension of the spring 21 until said handle member is in the position shown in full lines in Fig. 2, in which position the switch member 17 is again held in its inoperative position.

It will be apparent that my improved switch device is very simple in operation and efficient in use and all possibility of receiving shocks by the operator coming in contact with the electric circuit is obviated, and while I have shown what is known as a forked switch or a two-bladed switch device, it will be understood that my invention may be used in connection with what are known as knife switches as well as what is known as three or four blade switches, and various changes in and modifications of the details of construction herein shown and described may be made, within the scope of the appended claims, without departing from the spirit of my invention or sacrificing its advantages.

Having fully described my invention, what I claim as new and desire to secure by Letters Patent, is:—

1. A switch device of the class described comprising a suitable base or support, a fork-shaped switch member mounted to move longitudinally of the base and comprising a plurality of contact blade members secured in an insulated cross head, a plurality of pairs of spring contact devices mounted on the base and in connection with which the contact blades of the switch member are adapted to operate, means for holding the switch member in an inoperative position with the contact blades thereof in engagement with one pair of contact devices only, and resilient means for moving the contact blades of the switch member into engagement with the other pair of contact devices, and for holding said blades in engagement with the latter pair of contact devices.

2. A switch device of the class described comprising a suitable base or support, a fork-shaped switch member mounted to move longitudinally of the base and comprising a plurality of contact blades mounted in an insulated support, a plurality of spring contact devices mounted on the base and in connection with which the contact blades of the switch member are adapted to operate, a handle member in operative connection with the switch member and by means of which the switch member may be moved into an inoperative position, tensional means for moving the switch member into an operative position and for holding the same in said position, and means on said handle member and operated thereby for holding the switch member in its inoperative position against the action of said tensional means.

3. A switch device of the class described comprising a suitable casing, a plurality of electric contact devices in said casing arranged in pairs longitudinally of said casing, a fork-shaped switch member movably mounted in said casing and provided with blades which are adapted to operate in connection with the separate pairs of contact devices in said casing, said switch member protruding through one end of the casing, a handle member pivoted to the protruding portion of said switch member, means on said handle member adapted to operate in connection with said casing for holding the switch member in an inoperative position with the blades thereof in engagement with one of the contact devices in each pair, and tensional means within the casing for moving said switch member or the blades thereof into engagement with the other contact devices in each pair to close the circuit therebetween when the last named means is released, said tensional means also functioning to hold the blades in engagement with the last named contact devices.

4. A switch device comprising a base carrying a plurality of alined bearings, a plurality of pairs of contact devices, an axially slidable rod mounted in said bearings and carrying an insulated cross-head provided with a plurality of contact blades which engage one pair of the contact devices at all times and which are movable into and out of engagement with a second pair of contact devices, a coil spring surrounding the rod and bearing against said cross-head and one of said bearings for moving the blades into contact with the second pair of contact devices and for holding the blades in contact with the latter, and manually controlled means connected to the rod for drawing the blades away from the second pair of contact devices and for locking the rod in the position in which the blades are disengaged from the last named contact devices.

5. A switch device of the kind defined by claim 4 in which the last named means consists of a handle having its intermediate portion pivotally connected to said rod, said handle being adapted to be moved into alinement with said rod to cause one end of the handle to engage one of said bearings for holding the blades out of engagement with the second pair of contact devices, and said handle being movable into a position at right angles to said rod to permit the spring to move said rod.

In testimony that I claim the foregoing as my invention I have signed my name in presence of the subscribing witnesses this 21st day of May, 1919.

SAMUEL B. COHEN.

Witnesses:
C. E. MULREANY,
H. E. THOMPSON.